United States Patent
Krausse

(10) Patent No.: US 6,866,391 B2
(45) Date of Patent: Mar. 15, 2005

(54) THERMAL CONDENSATE REDUCER FOR OPTICAL DEVICES

(75) Inventor: George J. Krausse, Fort Collins, CO (US)

(73) Assignee: Remote Sights, Ltd., Fort Collins, CO (US)

(*) Notice: Subject to any disclaimer, the term of this patent is extended or adjusted under 35 U.S.C. 154(b) by 232 days.

(21) Appl. No.: 10/279,140

(22) Filed: Oct. 22, 2002

(65) Prior Publication Data
US 2003/0091089 A1 May 15, 2003

Related U.S. Application Data
(60) Provisional application No. 60/335,974, filed on Nov. 14, 2001.

(51) Int. Cl.$^7$ .............................................. G02B 11/04
(52) U.S. Cl. ........................ 359/512; 359/513; 374/16; 374/28
(58) Field of Search ................................ 359/512–513; 374/16, 28; 219/202–205, 495–508

(56) References Cited

U.S. PATENT DOCUMENTS

| | | | |
|---|---|---|---|
| 4,035,644 A | * 7/1977 | Ciemochowski | 250/340 |
| 4,277,672 A | * 7/1981 | Jones | 219/497 |
| 4,568,281 A | 2/1986 | Harvey et al. | 433/30 |
| 4,776,179 A | * 10/1988 | Ta | 62/176.6 |
| 4,889,280 A | * 12/1989 | Grald et al. | 236/44 C |
| 4,933,684 A | 6/1990 | Tasaki et al. | 346/1.1 |
| 6,100,500 A | * 8/2000 | Jefferson et al. | 219/203 |
| 6,163,013 A | 12/2000 | King et al. | 219/203 |
| 6,250,134 B1 | 6/2001 | Ruppert | 73/29.01 |
| 6,627,851 B2 | * 9/2003 | Sangwan et al. | 219/203 |

* cited by examiner

Primary Examiner—Mohammad Sikder
(74) Attorney, Agent, or Firm—Paul M. Thompson; Cochran Freund & Young LLC

(57) ABSTRACT

The present invention provides a method and system to overcome and eliminate the effects of condensation contamination of optical surfaces that are induced by radiative cooling. The invention counteracts the effects of radiative cooling on optical surfaces and maintains an optical system within a very tight limit to the ambient temperature by utilizing a resistive heater element that is in contact with the optical components subject to condensation. In thermal contact with this optical component is a solid-state precision temperature sensor. In addition, there is a matching solid-state precision temperature in thermal contact with the ambient air but thermally isolated from the optical element. Signals from these two sensors are applied to a comparator that functions to generate a data signal when the optical surface temperature is less than the ambient or reference temperature. This data signal is used to activate a solid-state power switch that applies a voltage to a resistive heating element. An offset may also be applied to the reference temperature sensor allowing compensation for the thermal resistance of the system comprised of the optical component, optical component attachment heater and temperature sensor.

35 Claims, 5 Drawing Sheets

THERMAL CONDENSATE REDUCER FOR OPTICAL DEVICES

CROSS REFERENCE TO RELATED APPLICATIONS

This application is based upon and claims the benefit of U.S. provisional application No. 60/335,974, entitled "THERMAL CONDENSATE REDUCER FOR OPTICAL DEVICES", filed Nov. 14, 2001, the entire disclosure of which is herein specifically incorporated by reference for all that it discloses and teaches.

BACKGROUND OF THE INVENTION

1. Field of the Invention

The present invention generally pertains to the reduction and prevention of water vapor condensation on optical systems and particularly to astronomical optical devices used in an outdoor environment.

2. Description of the Background

Optical devices in general, and astronomical optical devices in particular, are highly sensitive to the effects of particulate contamination degrading the ability of the optical surfaces to refract and transmit light effectively. One of the most detrimental and common forms of particulate contamination is the formation of water condensate on lenses from the surrounding air. This condition can occur in a situation where the relative humidity (RH) of the viewing environment is very high or when the optical components are at a temperature that is less than the surrounding air and particularly if the components are below the dew point of the ambient air.

SUMMARY OF THE INVENTION

The present invention overcomes the disadvantages and limitations of the prior art by providing a method and system to overcome and eliminate the effects of condensation contamination of optical surfaces that are induced by radiative cooling. The invention encompasses a method and system to precisely counteract the effects of radiative cooling on optical surfaces and maintain the temperature of an optical system within a very tight limit to the ambient temperature.

The present invention may therefore comprise a method of reducing water vapor condensation on an optical surface that is subject to condensation comprising; measuring the ambient temperature of the air surrounding the optical surface, measuring the surface temperature of the optical surface, comparing the ambient temperature of the air surrounding the optical surface to the surface temperature of the optical surface to establish a temperature differential, increasing the surface temperature of the optical surface to reduce the water vapor condensation on the optical surfaces by introducing heat to the optical surface with a heating element, regulating the amount of heat applied to the optical surface by establishing a temperature setpoint and a thermostatic range for the optical surface based upon the temperature differential.

The present invention may also comprise a method of reducing water vapor condensation on an optical surface that is subject to condensation comprising; measuring the ambient temperature of the air surrounding an optical surface with a thermal sensor that is thermally isolated from the optical surface, establishing a current ambient temperature from the measurement of the ambient temperature, measuring the ambient relative humidity of the air surrounding the optical surface with a hygrometric sensor, establishing a current ambient relative humidity from the measurement of the ambient relative humidity, measuring the surface temperature of the optical surface with thermal sensor in thermal communication with the optical surface, establishing a current optical surface temperature from the measurement of the surface temperature calculating a dew point for the ambient air by comparing the current ambient relative humidity to the current ambient temperature, generating a data signal when the surface temperature of the optical surface is lower than a selected threshold above the calculated dew point, heating the optical components in response to the data signal to increase the surface temperature of the optical surface to a point greater than the selected threshold above the calculated dew point.

The present invention may also comprise a system for reducing water vapor condensation on an optical surface that is subject to condensation comprising; a first temperature sensor for measuring the surface temperature of the optical surface, a second temperature sensor for measuring the ambient temperature of the air surrounding the optical surface, a comparator for comparing the first temperature sensor to the second temperature sensor and establish a temperature differential from the comparison, a heating element to transfer heat to the optical surface, a controller to regulate the heating element by establishing a temperature setpoint and a thermostatic range for the optical surface based upon the temperature differential.

The present invention may also comprise a system for reducing water vapor condensation on an optical surface of a telescope that is subject to condensation comprising; a first temperature sensor that measures the surface temperature of the optical surface to provide a current surface temperature data signal, a second temperature sensor that measures the ambient temperature of the air surrounding the optical surface to provide a current ambient temperature data signal, a hygrometric sensor for measuring the ambient relative humidity of the air surrounding the optical surface to provide a current ambient relative humidity data signal, a controller that calculates a dew point of the ambient air by comparing the current ambient relative humidity to the current ambient temperature, a comparator that establishes a temperature differential by comparing the current surface temperature data signal to the dew point, a signal generator that generates a heater control signal, a heating element that responds to the heater control signal to transfer heat to the optical surface.

The method and system detailed in the disclosed embodiments allow a user to maintain the temperature of optical surfaces to within a tight temperature range of the ambient temperature, or to maintain the temperature of optical surfaces at a set temperature above the dew point, and thus, eliminate the condensation associated with radiative cooling. The disclosed invention is compact, self-contained, portable and adaptable to a wide variety of optical surfaces. The invention has the further advantage of being easy to use (set-and-forget) and can maintain the temperature of a number of optical surfaces at once. The invention also has the benefit of maintaining reduced thermal distortion from heating the optical surface because of the tight temperature range that the invention is able to maintain. The optical surfaces should not see more than a few degrees temperature swing when the invention is in operation, and therefore, extensive heating is minimized.

DETAILED DESCRIPTION OF THE INVENTION

Figure 1:
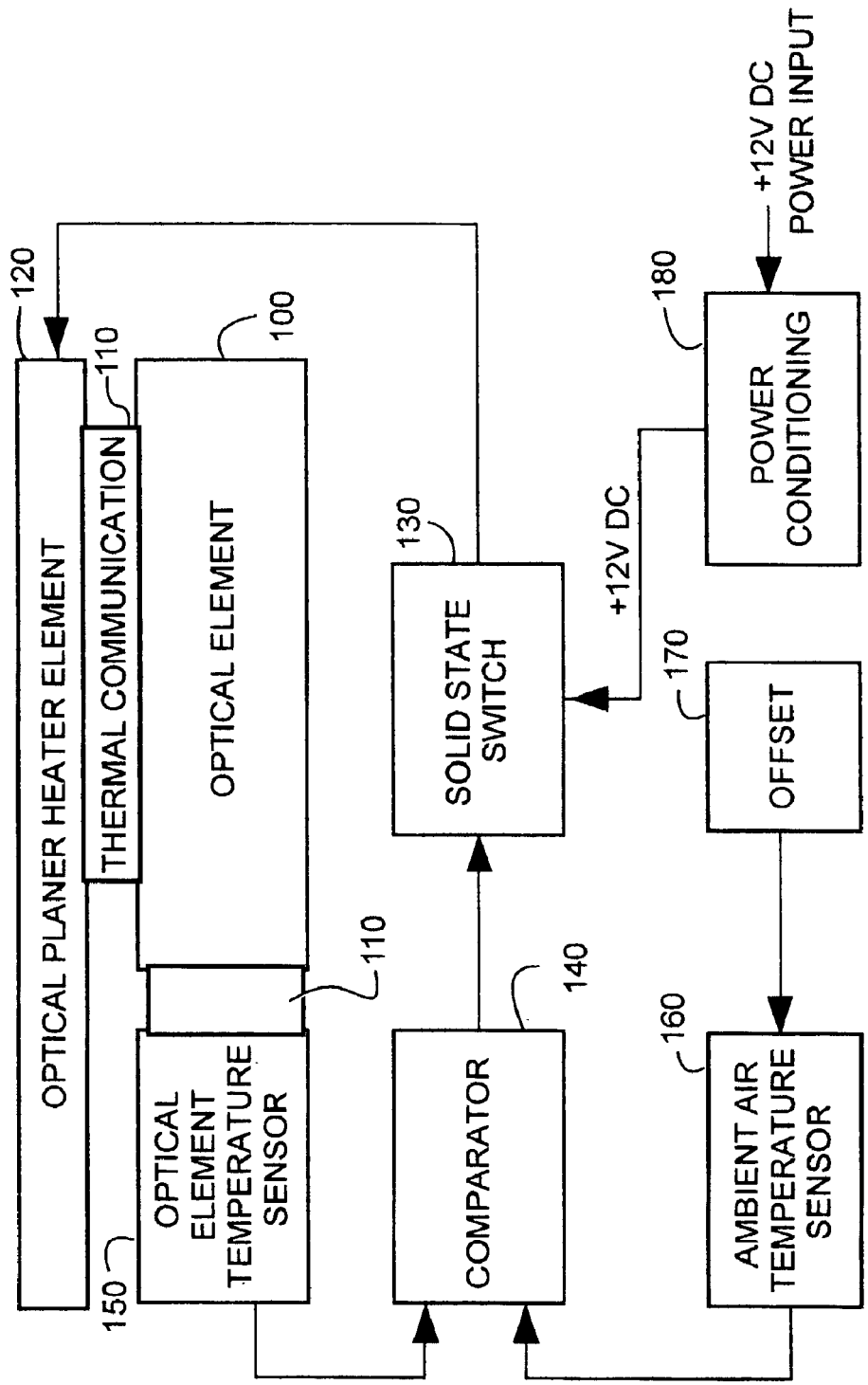
FIG. 1 is a block diagram of an embodiment of a method of the reduction and prevention of condensation on optical systems.

FIG. 1 is a block diagram illustrating the general concepts of at least one embodiment of the present invention. One embodiment disclosed herein has a resistive heater element is in contact with the optical components that are subject to condensation although any manner of transmitting heat can be used including radiative methods such as irradiation. Also in thermal contact with this optical component, is a solid-state precision temperature sensor. In addition, there is a matching solid-state precision temperature in thermal contact with the ambient air, but thermally isolated from the optical element. Signals from these two sensors are applied to a comparator which generates a data signal when the optical temperature sensor is measuring an optical component temperature that is less than the ambient or reference temperature. This data signal is used to activate a solid-state power switch that applies a voltage to a resistive heating element. An offset may also be applied to the reference temperature sensor allowing compensation for the thermal resistance of the system comprised of the optical component, the optical component attachment heater and temperature sensor.

In another embodiment, a thin flexible printed circuit board populated with surface mount chip resistors and thermal sensors is bonded to a flexible strap. The flexible strap is placed in thermal contact with the optical component attachment and tightened so as to secure a good thermal contact with the component. Electrical wire leads are brought out to attach the circuit board to the controller. Any number of heater straps can be utilized in a wide variety of shapes and sizes to facilitate a multitude of optical components that can be thermally controlled. Heating elements can be designed in a number of configurations such as helical or circumferential straps placed near the outer edge of an optical component, as well as a wide variety of pad shapes that can be placed on other surfaces such as the backs of mirrors.

Another embodiment may encompass, for example, a circular heating pad mounted on the rear of the primary reflecting mirror of a Newtonian telescope, a small rectangular heating pad on the back side of the secondary mirror and a heating strap placed circumferentially around the eyepiece. The spotting scope may have a heating strap placed circumferentially around both the objective lens holder and the eyepiece. Each heat element contains a temperature sensor and is wired directly into the controller that can independently calculate the ambient temperature offset for each lens or mirror and adjust the heating to the individual components. Numerous heating elements can be independently controlled with a single controller.

An additional embodiment may include a hygrometer to monitor the relative humidity of the ambient air and thus establish a dew point. The electronic controller would then use this data to maintain the optical system temperature at a point slightly greater than the dew point.

Humidity is a general term that refers to the air's water vapor content and the source for most condensation contamination. Relative humidity is defined as the ratio of the amount of water vapor actually in the air compared to the amount of water vapor the air can hold at a particular temperature and pressure, or in other terms, the ratio of the air's actual vapor pressure to its saturation vapor pressure (capacity). In order for condensation to occur, the ambient air surrounding the optics must become saturated, even if the saturation only occurs within a very small boundary layer near the optical surface. Saturation of air is an atmospheric condition whereby the level of water vapor is the maximum possible at the existing temperature and pressure, i.e., 100% RH. When such a condition occurs, the air will seek an equilibrium vapor pressure through micro and macroscopic condensation.

Unfortunately, the steadiest, sharpest telescopic views are often experienced under precisely the atmospheric conditions that cause condensation to form. A common situation occurs when one utilizes an astronomical viewing device such as a telescope, binocular, charged coupled device (CCD) imaging or the like, in an outdoor environment in cooler temperatures. Typically at night, the RH will be high and increase as the air continues to cool through the night and thus, the difference between the ambient air temperature and the dew point decreases. Dew Point represents the temperature to which air would have to be cooled (with no change in air pressure or moisture content) for saturation to occur. A simple example of condensation or "dew physics" occurs when you take a beverage can out of the refrigerator. When placed at normal room temperature where the can is colder than the air's dew point, it drips with condensation. A similar situation occurs with telescopes under a clear night sky.

The Second Law of Thermodynamics suggests that an optical device would achieve equilibrium with the ambient air, and as long as that air maintained moisture content above saturation, no condensation would occur. On the contrary, if one were to take a surface temperature measurement of the optics at a time when equilibrium would be expected, one would find that the surface temperature is actually several degrees cooler than the ambient air temperature. Objects do try to achieve temperature equilibrium with their environment as the Second Law says, but conduction is not the only mechanism by which these objects are bound. Optical surfaces like any other objects are also influenced by convection and more importantly, radiation. The temperature differential at the surface of these objects is caused by thermal radiant energy being propagated to the cold night sky. The effective temperature of the dark night sky is only a few degrees above absolute zero, and the telescope in an open field is exposed to an entire celestial hemisphere of thermal sink.

As the optical surfaces cool quickly by thermal radiation, the surrounding boundary layer of air attempts to equilibrate the temperature differential by transferring heat to the optics. As the boundary layer air temperature decreases to or below the dew point, saturation occurs and condensation begins to form on solid surfaces. Because this phenomenon will continue until equilibrium vapor pressure is achieved, mere wiping of the optical surfaces in attempt to dry them is not feasible.

The greatest occurrences of optical contamination by condensation are on the exposed parts that are thin or have a low heat capacity and rapidly radiate energy. These are often essential and common structures in optical and telescopic instruments. Prior attempts to prevent condensation have been directed to shielding optics from as much exposure to the night sky as is feasible. Traditionally, a device called a dewcap can be placed extending beyond a lens to serve as a radiative shield to the night sky. In this configuration, the longer the dewcap, the more likely it is to be effective.

The impact of condensation on telescopic optics has evolved with time over the years. In the early '60s, most telescopes were Newtonian reflector types. In this configuration, the entire tube acts as a shield to the mirror positioned at the base and condensation was not of great concern. An open-tube reflector, however, would need a shroud along its entire length of open framework to gain such a benefit. In the 1970's, with the advent of Schmidt-Cassegrain telescopes, condensation became a much more relevant factor. These instruments have thin corrector plates, which quickly radiate heat and foster the formation of condensation.

Throughout the 1980's, open-tube (Dobsonian) telescopes proliferated through the market. These exposed reflectors were very susceptible to condensation. The open systems combined with the advent of high-performance eyepieces, which contain large amounts of glass, exacerbated the problem of condensation. Eyepieces are particularly prone to condensation because of the added humidity from the observer's eye and breath. Because the massive optics retain their heat longer than standard eyepieces, when they do become contaminated, the efforts to remedy the situation are also increased. The need for a means to overcome this contamination was never more necessary.

As optics have evolved, various new mechanisms have been introduced in the optical systems. The advent of CCD imaging devices and autoguiders, have created an entirely new set of condensation challenges. The high sensitivity CCD's, easily renders these devices useless in the presence of even a moderate quantity of condensation. Autoguiders can lose the ability to guide or track when dew inhibits the imaging ability of the autoguiders.

With the advent of these new and complex optical and digital electronic systems, the passive shielding of optical systems is no longer able to affect a suitable a way to prevent condensation. An active mechanism to remove, as well as prevent dew formation, is needed. One of the most common means for dealing with condensation or dewing of optics has been to apply heat to the effected instrumentation. This has most commonly been performed with either hot air or direct contact with an electric heating mechanism. Hot air has been applied with "hair dryer" and "windshield defroster" type devices for many years with very limited success. While these devices can remove the condensate in a relatively quick and efficient manner, the blast of hot air temporarily creates thermal aberrations that limit the ability of the telescope. This distortion is in addition to any introduction of thermal deformation to the optics themselves. Air heaters produce superficial and uneven heating of surfaces that can deform and distort the images. Hot air is also only a temporary solution. The moment that the hot air is removed from the optical surfaces, these surfaces immediately begin to cool and initiate the radiative cooling so that the condensation process begins once again. A telescope can actually lose an entire magnitude of light grasp before the unaided eye can detect condensate on the optical surfaces. Contact heaters, which typically may comprise nichrome wire heating elements or electrical resistors soldered in series and placed against the optical surfaces, have had limited success in dealing with condensation problems. In these devices, it is the control of the heating element that has been deficient. These heaters also cause thermal distortion of the optical surfaces and can often be a danger to the user when controlled by a large DC or 120 volt AC power source.

Several commercial systems and numerous do-it-yourself plans have been developed for removing dew on telescope optics. The biggest drawback of current systems has been the lack of ability to control and minimize the heat applied to the optics as well as the ability to "set and forget" the heater. These systems typically incorporate a heating mechanism with a rheostat, which is a simple duty cycle adjustment for the power supply. The set point of the device is estimated by the user and can often require constant monitoring and readjustment to achieve the intended result. It is also often very difficult or impossible for the user to maintain optics at their optimal performance temperature which is the ambient temperature. It is obvious that by simply heating the optics, even with a fixed temperature control device, the desired results are not achieved.

Referring again to FIG. 1, the block diagram illustrates the manner in which condensation on optical elements can be reduced or prevented. Optical element 100 is in thermal communication 110 with both the optical planer heater element 120 and the optical element temperature sensor 150. The temperature of the optical element 100 is measured by the optical element temperature sensor 150 and electronically transmitted to the comparator 140. Ambient air surrounding the optical device is measured by the ambient air temperature sensor 160 and electronically transmitted to the comparator 140. An offset 170 can be applied to the ambient air temperature sensor 160 to allow compensation for the thermal resistance of the system comprising the resistance of the optical element 100, the optical planner heater element 120, and the temperature sensor 150. A comparator circuit 140 analyzes the temperature inputs and generates a data signal when the optical element temperature is less than the ambient referenced temperature. The status signal is used to activate the solid-state power switch 130 and supply voltage from the conditioned power supply 180 to the optical planar heater element 120, which is in thermal communication with the optical element 100.

Figure 2A:
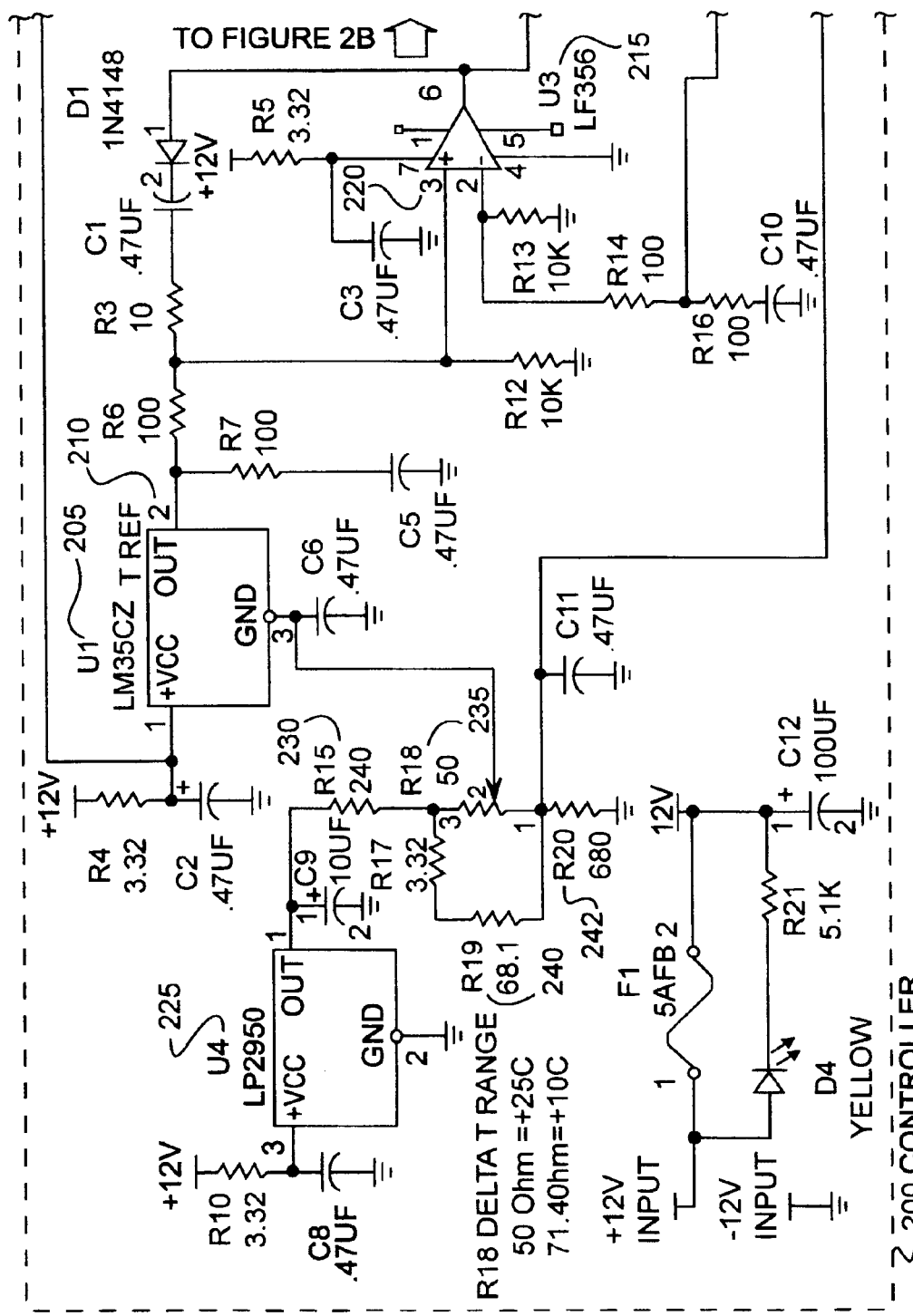
FIG. 2A is a partial circuit diagram detailing an embodiment of a device for the reduction and prevention of condensation on optical systems.
Figure 2B:
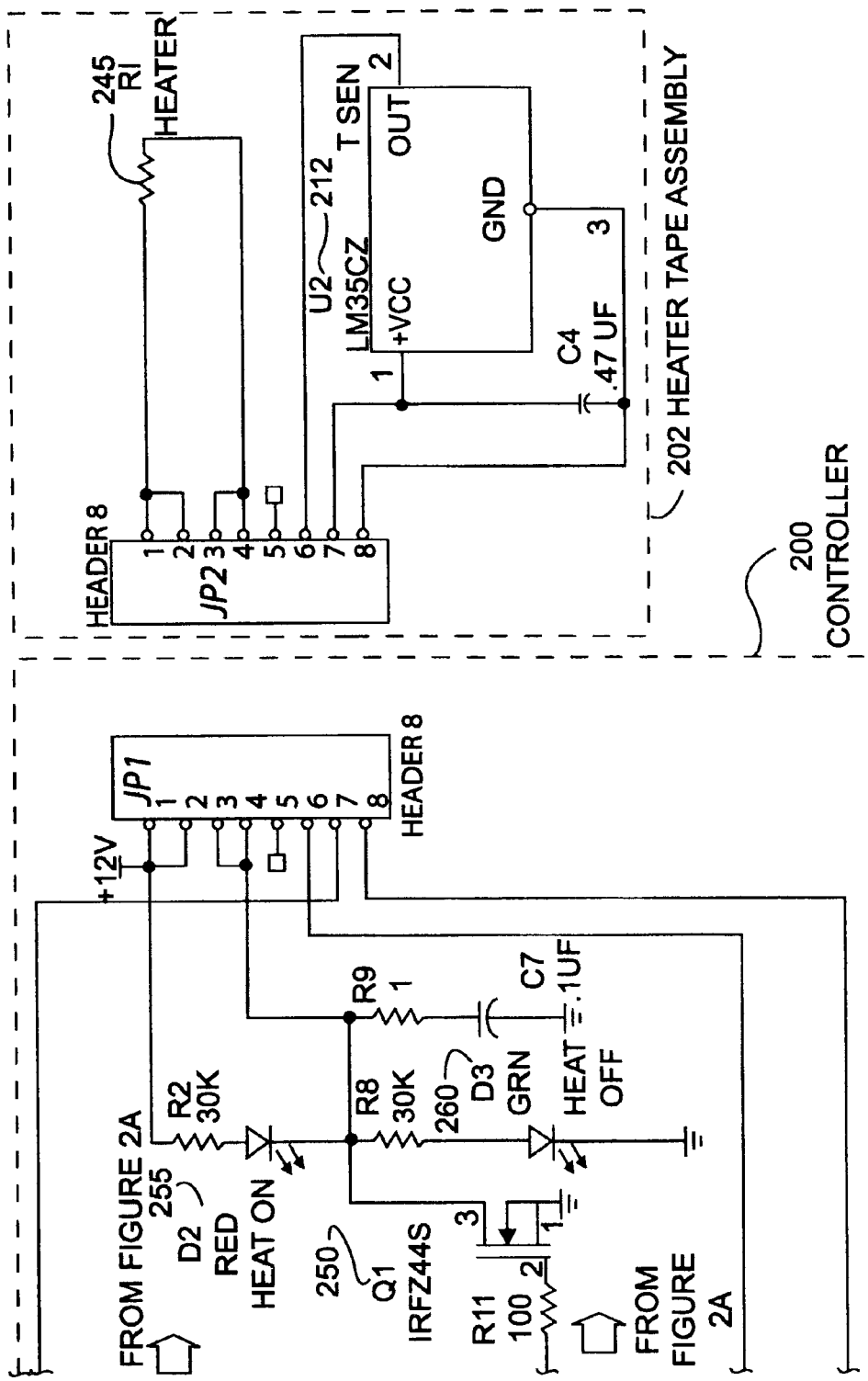
FIG. 2B is the remaining part of the circuit diagram detailing an embodiment of a device for the reduction and prevention of condensation on optical systems.

Illustrated in FIGS. 2A and 2B illustrate a circuit diagram detailing an embodiment of a device for the reduction and prevention of condensation on optical systems including a controller 200 and the heater tape assembly 202. Integrated circuit U1, 205 provides an output voltage at pin 2, 210 which is proportional to the ambient air temperature. This voltage is applied to pin 3, 220 of integrated circuit U3, 215 which is an operational amplifier used as a comparator. Integrated circuit U4, 225 is a temperature stabilized voltage reference. The output of integrated circuit U4, 225 provides a reference voltage for integrated circuit U1, 205 and integrated circuit U2, 212 via resistor R15, 230, resistor R18, 235, resistor R19, 240, and resistor R20, 242. This network allows the user to set a thermal offset to compensate for the thermal resistance between the heater resistor R1, 245 and the optical element (not shown). As the temperature of integrated circuit U2, 212 falls bellow the offset, the output of integrated circuit U3, 215 raises to +12V. This turns on power MOSFET Q1, 250 allowing current to flow thru resistor R1, 245 and heat resistor R1, 245 and the optical element. This continues until the temperature of integrated circuit U2, 212 is equal to the offset. This on-off action continues as long as power is applied to the system, thus regulating the temperature of the optical component to within approximately ±2 degrees C. of the offset set point and tracks the air temperature. The light emitting diode D2, 255 provides a heat on indication while diode D3, 260 provides a cooling indication.

FIGS. 2A and 2B illustrate a circuit diagram for controlling a DC electric heating element. A variety of systems and methods for controlling the amount, intensity and duration of the heat applied to the optical surface have been contemplated and are not limited by the disclosed embodiments. Constant heating at a constant level can be applied in an on-off (go-no go) method where the heat is only applied when the optical surface temperature is between a lower and upper threshold limit, or variable heating (intensity or duty cycle for example) can be applied based upon other thermal factors such as how far away the current surface temperature is from a temperature setpoint.

Figure 3:
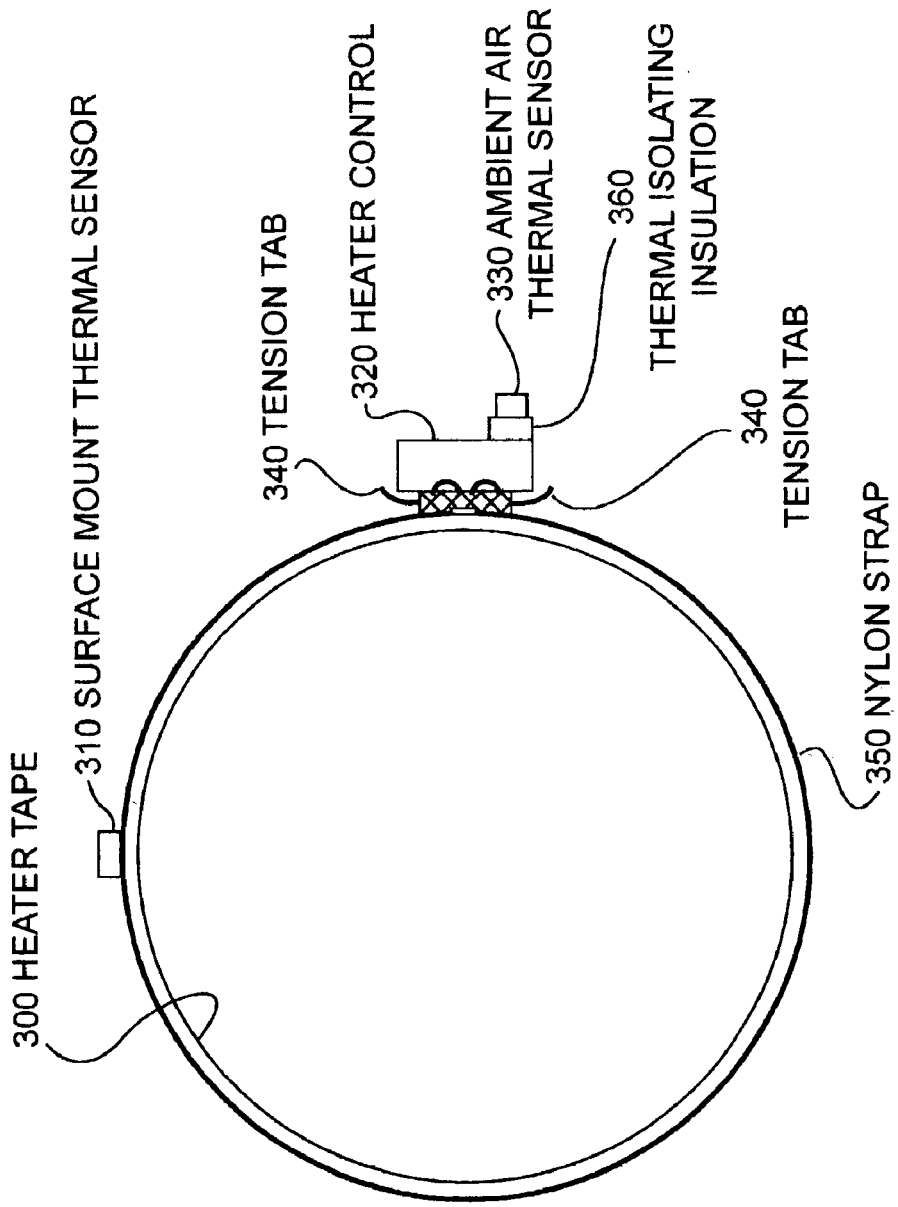
FIG. 3 is an illustration of a telescope with a condensate reduction device.

As shown in FIG. 3, a thin flexible printed circuit board populated with surface mount chip resistors is encapsulated to form a heater tape 300 and is bonded to a nylon strap 350 that can be circumferentially mounted around an optical surface. A surface mount thermal sensor 310 is also incorporated in the nylon strap 350 to register the temperature of the optical surface. The nylon strap 350 is held in place by friction that is adjusted by tension tabs 340. The heater control 320 is mounted above the tension tabs 340. The ambient air thermal sensor 330 is isolated from the optical surface by thermal insulation 360 and measures ambient air temperature. Electrical wire leads are brought out attaching all the electrical components to the main controller.

A specific embodiment of the present invention can be utilized in a wide variety of forms. The system can be embodied using flexible straps or pads that can permanently or temporarily attach to, or attach in proximity to the optical surfaces. The flexible straps can be made out of a multitude of rigid and/or non-rigid materials that may incorporate heater elements, temperature and/or hygrometric sensors within single or multiple straps. Heater elements can be conductive (i.e., AC or DC electrical), radiative (i.e., infrared), or convective. Electrical heater elements can be resistive heater tape, flexible printed circuit boards populated with bonded surface mount chip resistors, heating coils etc. Controller units can be dedicated to each individual optical surface or multiple controllers can be combined into a central controlling unit that can regulate the temperature of any number of optical surfaces either independently or as a single unit. Thermostatic setpoints and temperature ranges can be programmed into the controller and set independently for each optical surface or as a single parameter for all optical surfaces. The aforementioned system can an aftermarket device that attaches to existing optical equipment or can be incorporated into the design and manufacture of new optical equipment such as telescopes, binocular/monoculars scopes, mirrors, windows, viewing ports or any other type of optical surface that is subject to condensation.

Figure 4:
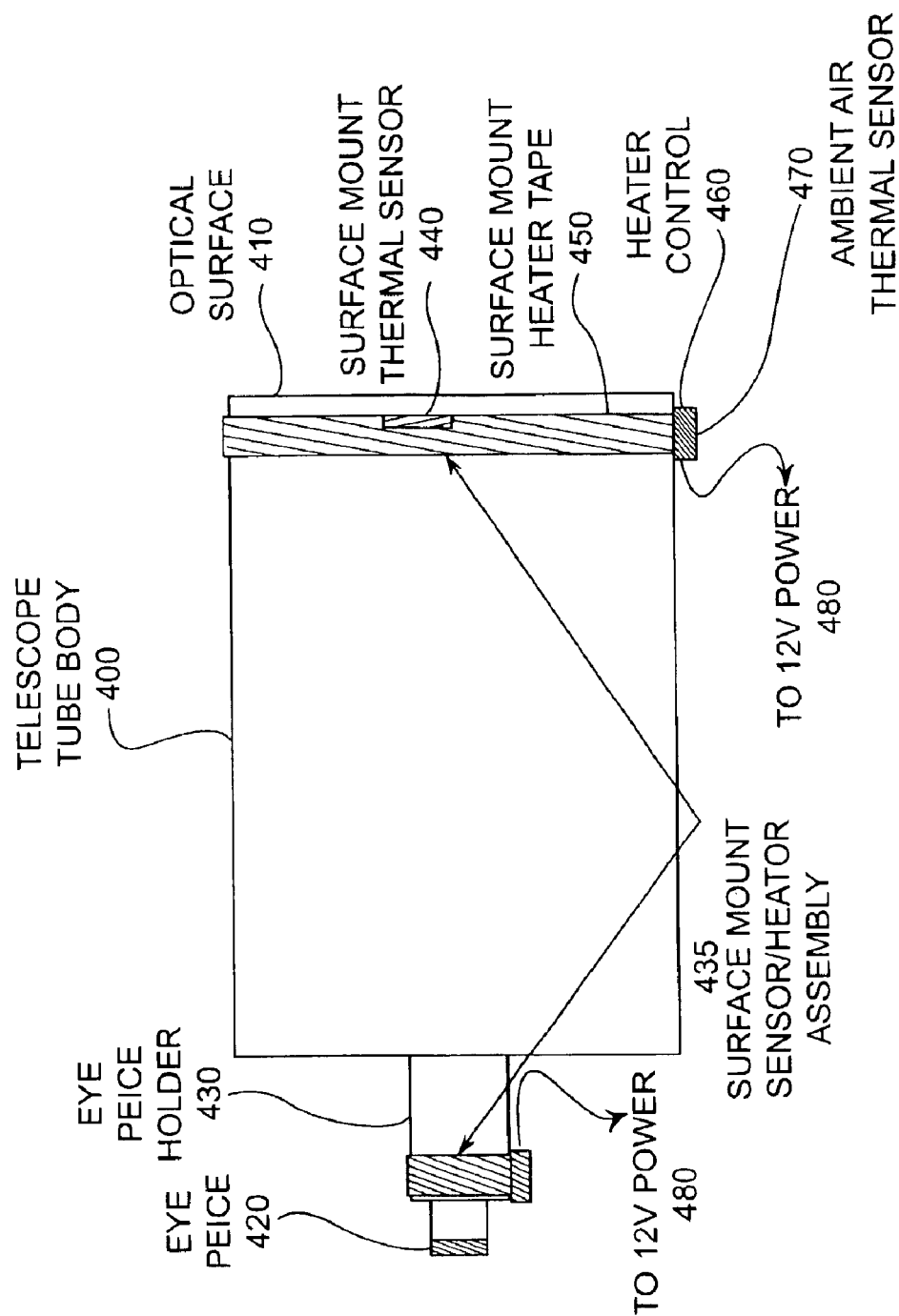
FIG. 4 is an illustration of a surface mount printed circuit board heater for a condensate reduction device.

FIG. 4 is an illustration of a telescope with a condensate reduction device in place. A typical refractor telescope configuration is shown with the main features comprising a telescope body 400, entraining and optical surface 410 on one end, and an eyepiece holder 430 on the opposing end. The primary optical surface 410 is heated by a surface mount sensor/heater assembly 435 comprising surface mount heater tape 450, surface mount thermal sensor 440, the heater control 460 and an ambient air thermal sensor 470. The eyepiece holder 430 is in connection with the eyepiece 420 and retains an additional heater assembly 435, which similarly contains (but does not show) surface mount heater tape, surface mount thermal sensor, heater control and ambient air thermal sensor. Each heater assembly 435 is connected to a 12-volt power supply 480.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for reducing water vapor condensation on an optical surface that is subject to condensation comprising;
    a first temperature sensor for measuring the surface temperature of said optical surface;
    a second temperature sensor for measuring the ambient temperature of the air surrounding said optical surface;
    a comparator for comparing said first temperature sensor to said second temperature sensor and establish a temperature differential from said comparison;
    a heating element to transfer heat to said optical surface;
    a controller to regulate said heating element by establishing a temperature setpoint and a thermostatic range for the optical surface based upon said temperature differential.

2. The system of claim 1 wherein said first temperature sensor is a surface mounted thermal sensor in thermal communication with said optical surface.

3. The system of claim 1 wherein said second temperature sensor is a surface mounted thermal sensor that is thermally isolated from said optical surface.

4. The system of claim 1 wherein said first and second temperature sensors are solid-state precision temperature sensors.

5. The system of claim 1 wherein said controller is used to activate a solid-state power switch that applies voltage to said heating element.

6. The system of claim 1 wherein said heating element is an electric resistive heating element.

7. The system of claim 6 wherein said electric resistive heating element is a thin, flexible printed circuit board populated with surface mount chip resistors bonded to a flexible strip.

8. The system of claim 7 wherein said flexible strip includes said thermal sensors.

9. The system of claim 1 wherein said controller further comprises;
    a compensator for incorporating the thermal resistance of the system comprising said optical surface, said heating element and said temperature sensors.

10. A system for reducing water vapor condensation on an optical surface that is subject to condensation comprising;
    a surface mounted first temperature sensor for measuring the surface temperature of said optical surface that is in thermal communication with said optical surface, wherein said first temperature sensor is a solid-state precision temperature sensor;

a surface mounted second temperature sensor for measuring the ambient temperature of the air surrounding said optical surface that is thermally isolated from said optical surface, wherein said second temperature sensor is a solid-state precision temperature sensor;

a comparator for comparing said first temperature sensor to said second temperature sensor and establish a temperature differential from said comparison;

an electric resistive heating element to transfer heat to said optical surface;

a controller to activate a solid-state power switch that applies a voltage to regulate said electric resistive heating element by establishing a temperature setpoint and a thermostatic range for the optical surface, based upon said temperature differential, said electric resistive heating element further comprising a thin, flexible printed circuit board populated with surface mount chip resistors bonded to a flexible strip;

a compensator for incorporating the thermal resistance of the system comprising said optical surface, said heating element and said temperature sensors.

11. A system for reducing water vapor condensation on an optical surface of a telescope that is subject to condensation comprising;

a first temperature sensor for measuring the surface temperature of said optical surface that generates a current surface temperature data signal;

a second temperature sensor for measuring the ambient temperature of the air surrounding said optical surface that generates a current ambient temperature data signal;

a comparator that establishes a temperature differential by comparing said current surface temperature data signal to said current ambient temperature data signal;

a signal generator that generates a heater control signal;

a heating element that responds to said heater control signal to transfer heat to said optical surface and reduce said water vapor condensation on said optical surface;

a controller that analyzes said temperature differential and said heater control signal to regulate said heat applied to said heating element and maintain a selected thermostatic temperature range for the optical surface by controlling the amount of said heat applied by said heating element.

12. The system of claim 11 wherein said first temperature sensor is a surface mounted thermal sensor in thermal communication with said optical surface.

13. The system of claim 11 wherein said second temperature sensor is a surface mounted thermal sensor that is thermally isolated from said optical surface.

14. The system of claim 11 wherein said first and second temperature sensors are solid-state precision temperature sensors.

15. The system of claim 11 wherein said heater control signal is used to activate a solid-state power switch that applies voltage to said heating element.

16. The system of claim 11 wherein said signal generator generates said heater control signal when said temperature differential reaches a selected lower limit threshold and continues until a selected upper limit threshold above said selected lower limit threshold is reached.

17. The system of claim 11 wherein said heater control signal varies with the change in said temperature within said temperature differential.

18. The system of claim 11 wherein said heating element is an electric resistive heating element.

19. The system of claim 18 wherein said electric resistive heating element is a thin, flexible printed circuit board populated with surface mount chip resistors bonded to a flexible strip.

20. The system of claim 19 wherein said flexible strip includes said thermal sensors.

21. The system of claim 11 wherein said controller further comprises;

a compensator for incorporating the thermal resistance of the system comprising said optical surface, said heating element and said temperature sensors.

22. A system for reducing water vapor condensation on an optical surface of a telescope that is subject to condensation comprising;

a first surface mounted solid-state precision temperature sensor in thermal communication with said optical surface for measuring the surface temperature of said optical surface;

said first sensor that generates a current surface temperature data signal;

a second surface mounted solid-state precision temperature sensor that is thermally isolated from said optical surface for measuring the ambient temperature of the air surrounding said optical surface;

said second sensor that generates a current ambient temperature data signal;

a comparator that establishes a temperature differential by comparing said current surface temperature data signal to said current ambient temperature data signal;

a signal generator that generates a heater control signal used to activate a solid-state power switch that applies voltage to said heating element;

an electric resistive heating element comprising a thin, flexible printed circuit board populated with surface mount chip resistors and said bonded to a flexible strip, activated by a solid-state power switch that applies voltage to electric resistive heating element in response to said heater control signal to transfer heat to said optical surface and reduce said water vapor condensation on said optical surface;

a controller that analyzes said temperature differential and said heater control signal to regulate said heat applied to said heating element and maintain a selected thermostatic temperature range for the optical surface by controlling the amount of said heat applied by said heating element.

a compensator for incorporating the thermal resistance of the system comprising said optical surface, said heating element and said temperature sensors.

23. A system for reducing water vapor condensation on an optical surface of a telescope that is subject to condensation comprising;

a first temperature sensor that measures the surface temperature of said optical surface to provide a current surface temperature data signal;

a second temperature sensor that measures the ambient temperature of the air surrounding said optical surface to provide a current ambient temperature data signal;

a hygrometric sensor for measuring the ambient relative humidity of the air surrounding said optical surface to provide a current ambient relative humidity data signal;

a controller that calculates a dew point of said ambient air by comparing said current ambient relative humidity to said current ambient temperature;

a comparator that establishes a temperature differential by comparing said current surface temperature data signal to said dew point;

a signal generator that generates a heater control signal;

a heating element that responds to said heater control signal to transfer heat to said optical surface.

24. The system of claim 23 wherein said first temperature sensor is a surface mounted thermal sensor in thermal communication with said optical surface.

25. The system of claim 23 wherein said second temperature sensor is a surface mounted thermal sensor that is thermally isolated from said optical surface.

26. The system of claim 23 wherein said first and second temperature sensors are solid-state precision temperature sensors.

27. The system of claim 23 wherein said signal generator generates said heater control signal when said temperature differential reaches a selected lower limit threshold and continues until a selected upper limit threshold above said dew point is reached.

28. The system of claim 23 wherein said heater control signal varies with the change in said temperature within said temperature differential.

29. The system of claim 23 wherein said heater control signal is used to activate a solid-state power switch that applies voltage to said heating element.

30. The system of claim 23 wherein said heating element is an electric resistive heating element.

31. The system of claim 30 wherein said electric resistive heating element is a thin, flexible printed circuit board populated with surface mount chip resistors bonded to a flexible strip.

32. The system of claim 31 wherein said flexible strip includes said thermal and said hygrometric sensors.

33. The system of claim 23 wherein said controller further comprises;

a compensator for incorporating the thermal resistance of the system comprising said optical surface, said heating element, said temperature sensors and said hygrometric sensors.

34. A system for reducing water vapor condensation on an optical surface of a telescope that is subject to condensation comprising;

a first surface mounted solid-state precision temperature sensors in thermal communication with said optical surface for measuring the surface temperature of said optical surface;

said first sensor that generates a current surface temperature data signal;

a second surface mounted solid-state precision temperature sensors that is thermally isolated from said optical surface for measuring the ambient temperature of the air surrounding said optical surface;

said second sensor that generates a current ambient temperature data signal;

a hygrometric sensor for measuring the ambient relative humidity of the air surrounding said optical surface that generates a current ambient relative humidity data signal;

said hygrometric sensor that generates a current ambient relative humidity data signal;

a controller that calculates a dew point of said ambient air by comparing said current ambient relative humidity to said current ambient temperature;

a comparator that establishes a temperature differential by comparing said current surface temperature data signal to said dew point;

a signal generator that generates a heater control signal;

said signal generator generates said heater control signal when said temperature differential reaches a selected lower limit threshold and continues until a selected upper limit threshold above said dew point is reached an electric resistive heating element comprising a thin, flexible printed circuit board populated with surface mount chip resistors and said bonded to a flexible strip, activated by a solid-state power switch that applies voltage to electric resistive heating element in response to said heater control signal to transfer heat to said optical surface;

a compensator for incorporating the thermal resistance of the system comprising said optical surface, said heating element and said temperature sensors.

35. A system for reducing water vapor condensation on an optical surface that is subject to condensation comprising;

a first temperature sensing means for measuring the surface temperature of said optical surface;

a second temperature sensing means for measuring the ambient temperature of the air surrounding said optical surface;

a comparing means for comparing said first temperature sensor to said second temperature sensor and establish a temperature differential from said comparison;

a heating means to transfer heat to said optical surface;

a controlling means to regulate said heating means by establishing a temperature setpoint and a thermostatic range for the optical surface based upon said temperature differential.

* * * * *